United States Patent
Vest et al.

(10) Patent No.: US 7,679,512 B2
(45) Date of Patent: Mar. 16, 2010

(54) SUPPORTING THE ACCURATE CHRONOLOGICAL ORGANIZATION OF RFID TAG DATA FROM DISTRIBUTED SOURCES

(75) Inventors: Thomas Vest, Roenne (DK); Anush Kumar, Seattle, WA (US); Flemming Gregersen, Hilleroed (DK); Janaki Ram Goteti, Hyderabad (IN); Kenneth Puggaard, Frederikssund (DK); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 11/529,172

(22) Filed: Sep. 28, 2006

(65) Prior Publication Data

US 2007/0296584 A1    Dec. 27, 2007

(51) Int. Cl.
    *G08B 13/14*    (2006.01)

(52) U.S. Cl. .................. 340/572.1; 340/10.1
(58) Field of Classification Search .............. 340/572.1; 705/28
See application file for complete search history.

(56) References Cited

U.S. PATENT DOCUMENTS

| | | |
|---|---|---|
| 7,295,114 B1 * | 11/2007 | Drzaic et al. ............. 340/572.1 |
| 2003/0201321 A1 * | 10/2003 | Maloney ..................... 235/384 |
| 2006/0022801 A1 * | 2/2006 | Husak et al. ............... 340/10.5 |
| 2006/0161344 A1 * | 7/2006 | Iwahori et al. .............. 701/211 |
| 2007/0046467 A1 * | 3/2007 | Chakraborty et al. .... 340/572.1 |
| 2007/0250358 A1 * | 10/2007 | Le .................................. 705/7 |

* cited by examiner

*Primary Examiner*—Toan N Pham
*Assistant Examiner*—Kerri McNally
(74) *Attorney, Agent, or Firm*—Westman, Champlin & Kelly, P.A.

(57) ABSTRACT

A computer-implemented method is disclosed for encouraging an accurate chronological organization of radio frequency identification (RFID) tag data gathered from distributed servers. The method includes limiting the processing of RFID tag data based at least in part on the operational status of a plurality of sources of RFID tag data.

20 Claims, 4 Drawing Sheets

SUPPORTING THE ACCURATE CHRONOLOGICAL ORGANIZATION OF RFID TAG DATA FROM DISTRIBUTED SOURCES

The present application claims priority of International patent application filed in India on Jun. 27, 2006 and assigned Ser. No. 1516/DEL/2006, the content of which is hereby incorporated by reference in its entirety.

BACKGROUND OF THE INVENTION

The present invention pertains to computer networks configured support the processing of reader inputs from radio frequency identification tags ("RFID tags"). More specifically, the present invention pertains to systems and methods for supporting the accurate chronological organization of RFID tag data gathered from distributed deployments of an RFID services platform.

In a network designed to receive reader inputs from RFID tags and transfer the inputs to a program designed to analyze and process the information, it is important to support an accurate chronological organization of the inputs. Correct information as to the sequence of events is difficult to monitor across a broad network with multiple servers that may be distributed in multiple locations. Further, some servers in the network may not always be on-line, which can have a negative impact on the accuracy of input chronology. An accurate chronological organization of RFID inputs can be critical to ensuring an accurate execution of related business processes.

SUMMARY OF THE INVENTION

Embodiments of the present invention pertain to a computer-implemented method for encouraging an accurate chronological organization of radio frequency identification (RFID) tag data gathered from distributed servers. The method includes limiting the processing of RFID tag data based at least in part on the operational status of a plurality of sources of RFID tag data.

DETAILED DESCRIPTION OF ILLUSTRATIVE EMBODIMENTS

Figure 1:
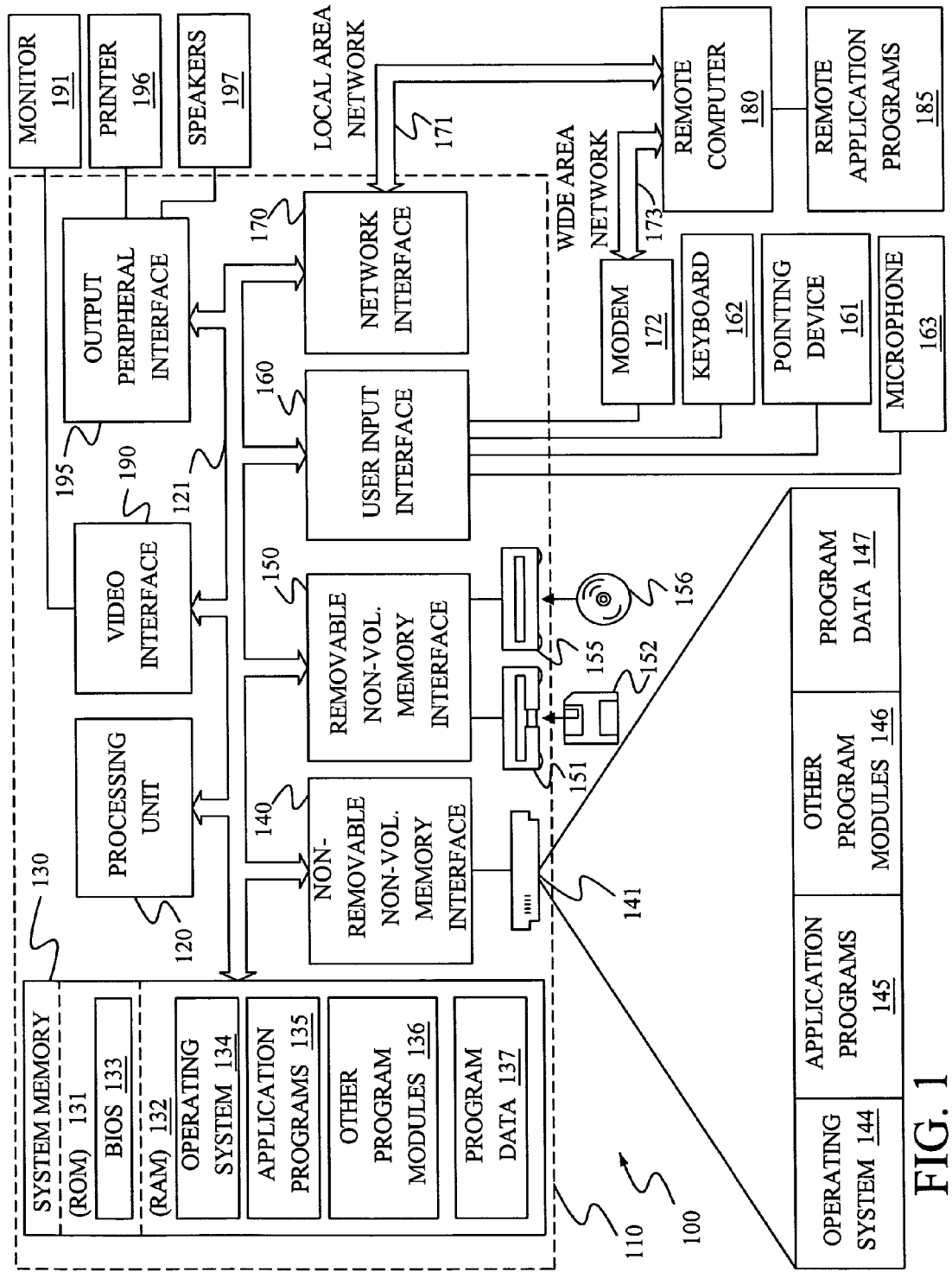
FIG. 1 is a block diagram of one computing environment in which the present invention may be implemented.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
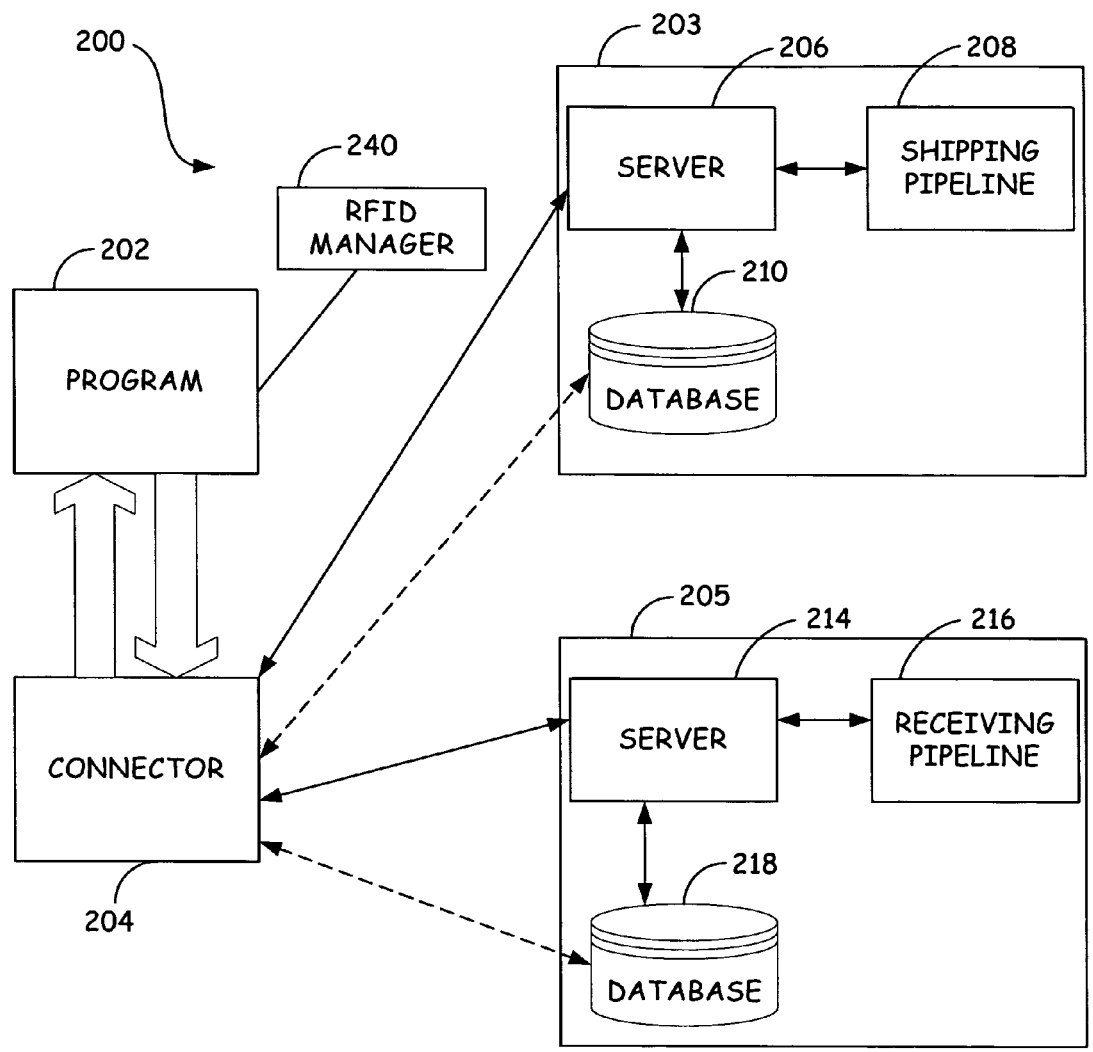
FIG. 2 is a schematic block diagram demonstrating an RFID data management system.

FIG. 2, in accordance with one aspect of the present invention, is a schematic block diagram demonstrating an RFID data management system 200. System 200 can be implemented for any of a variety of purposes. The scope of the present invention is not limited to application of system 200 in any one particular environment.

In one embodiment, system 200 is a computer-implemented system utilized by a business to automatically detect and track goods in various supply chains to provide, to some extent, real-time visibility of the status of those goods. In one embodiment, this real-time information is fed into related applications and processes to enable the business to determine the number, status and location of their goods anywhere from production through distribution, and potentially even up until they are sold by a retailer.

In another embodiment, system 200 is applied is a computer-implemented system utilized by a business to track goods outside of the supply chain. For example, the system can be applied to support an automated payment system or to support the tracking of rental equipment. System 200 can be implemented to track any type of object in the physical world.

System 200 is illustratively, but not necessarily, deployed on a server and includes a program 202 that includes at least one business process configured to process RFID data. System 200 also includes a connector 204 and a plurality of deployments 203 and 205 of an RFID services platform. Connector 204 is a connector module that enables program 202 to connect to and retrieve information from distributed servers associated with service deployments 203 and 205. Deployments 203 and 205 are configured to provide RFID information through connector 204 to program 202. Deployments 203 and 205 could be deployed in a single location or in different locations. It should be noted that system 200 is a simplified diagram showing only two deployments of an RFID services platform. Actual systems are likely to incorporate additional deployments. It should also be noted that the solid lines in FIG. 2 represent network access (e.g., a web service), while the dotted lines represent data access.

In accordance with one embodiment, connector 204 is configured to operate so as to accomplish any combination of at least three different behaviors. The first behavior is connection management. The second behavior is to monitor runtime system health. The third behavior is to transfer or redirect tag data. Of course, it is within the scope of the present invention to otherwise implement these particular behaviors.

Deployment 203 of the RFID services platform includes a shipping pipeline 208. Shipping pipeline 208 illustratively includes a device for collecting RFID information. In one embodiment, pipeline 208 includes an RFID tag reader configured to collect shipping information from RFID tags. For example, when an item is shipped, corresponding information is collected by device 208. The RFID data collected by device 208 is stored in database 210. Server 206 illustratively functions as an RFID middleware layer that provides software services to support the processing of RFID information gathered through pipeline 208. Server 206 supports the transfer of RFID information through connector 204 to program 202.

Deployment 205 of the RFID services platform includes a receiving pipeline 216 that illustratively includes another device for collecting RFID information. In one embodiment, pipeline 216 is an RFID tag reader configured to collect receiving information from RFID tags. For example, when an item is received, corresponding information is collected by device 216. With assistance from a data sink, the RFID data collected by device 216 is stored in database 218. Server 214 illustratively functions as an RFID middleware layer that provides software services to support the processing of RFID information gathered through pipeline 216. Server 214 supports the transfer of RFID information through connector 204 to program 202.

In accordance with one embodiment, the middleware server component is configured so as to assume responsibility for communicating with, and collecting data from, reader devices, and then storing the data in the database. In one embodiment, the data is then moved to a specialized sink from which the remote connector (e.g., connector 218) is able to process the data. Accordingly, in accordance with one embodiment of the present invention, one or more deployments of the RFID services platform will include a data sink component at the end of the processing pipeline for storing processed reads. The middleware server component illustratively will include a runtime component (e.g., a device manager) responsible for the functionality of the data sink.

In accordance with one aspect of the present invention, the middleware server layer (e.g., 206 and 214) associated with each deployment (e.g., 203 and 205) of the RFID services platform provides a set of RFID software services that support an integration of real-time, track-and-trace capabilities into a business application or program (e.g., 202). In one embodiment, the middleware server layer supports multi-vendor RFID hardware (readers/writers, tags, tag networks, etc.), including the discovery and management of such devices on a network. In one embodiment, the middleware server layer supports efficient capture and manipulation of RFID tag data and enables flexible integration into business-relevant applications (e.g., 202). In accordance with one embodiment, each deployment of the RFID services platform is hardware-agnostic and application-agnostic to enable application and program developers to easily define, test and deploy rich, robust and easy to manage RFID solutions.

Thus, system 200 provides a network designed to receive reader inputs from RFID tags and provide the inputs to a program 202 designed to analyze and process the information. In many cases, it will be important for program 202 to be able to sort out the chronological order in which inputs were received. For example, in the context of system 200, if tag reads were received out of order, it may happen that program 202 could generate an error by processing a shipping request for a product that has not been logged in as received. Ascertaining correct chronological information can be difficult across a network of multiple servers and associated reader devices, especially when consideration is given to the fact that certain servers and/or devices may not always be on-line.

In accordance with one aspect of the present invention, program 202 is provided with access to an RFID manager 240. While RFID manager 240 is illustrated in FIG. 2 as a component that is separate from program 202, it is to be understood that it can be an integrated component of program 202. Any other implementation of RFID manager 240 is also within the scope of the present invention.

In accordance with one embodiment, RFID manager 240 is an Axapta RFID manager in that it is configured to operate in the context of a specific enterprise resource planning solution, namely, Microsoft Business Solutions—Axapta offered by Microsoft Corporation of Redmond, Wash. In accordance with one embodiment, program 202 includes an installation of the Axapta product, including an Axapta RFID manager. Of course, it is to be understood that program 202, without departing from the scope of the present invention, could be a different application, a resource planning solution or otherwise.

In accordance with one embodiment, the RFID manger 240 is configured to support a collection of information related to individual devices (e.g., RFID reader devices), processes and/or servers affiliated through the network with program 202. Based on information collected from distributed deployments of an RFID services platform, chronological order can be monitored for the purpose of supporting evaluation and/or organization. In one embodiment, some assurance can be gleaned that correct chronological order has been maintained. Such assurance is beneficial in that it provides some level of guarantee that business processes executed by program 202 will be accurately executed (i.e., run at the correct time). In accordance with one embodiment, the information that RFID manager 240 is configured to collect includes an overview of installation details, information pertaining to the starting or stopping of processes, and/or information pertaining to the inclusion or exclusion statuses of servers, devices and/or processes.

Figure 3:
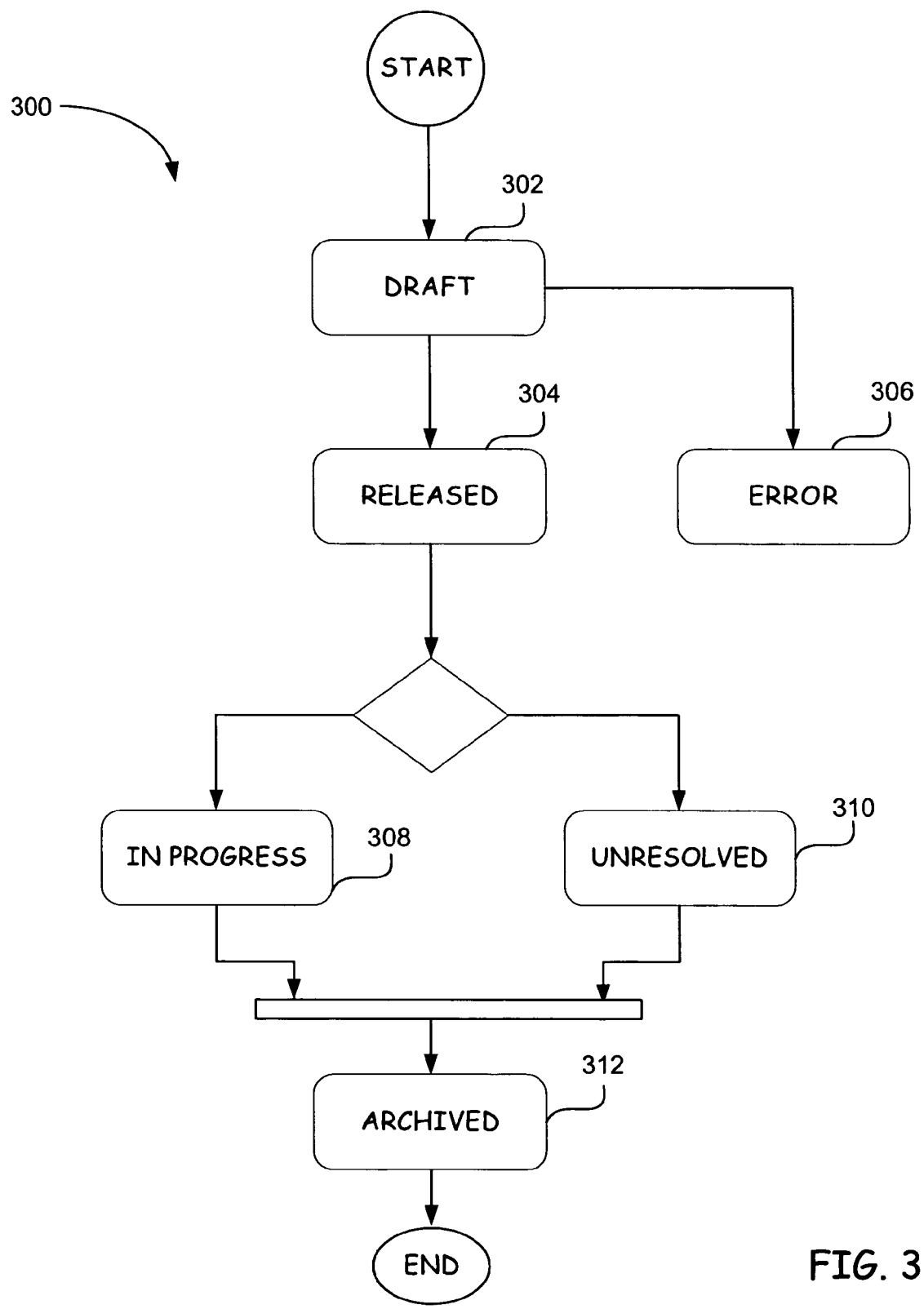
FIG. 3 is a block flow chart illustrating steps associated with execution of a process carried out by or in association with an RFID manager.

FIG. 3, in accordance with one aspect of the present invention is a block flow chart illustrating steps associated with execution of a process 300. Process 300 is illustratively carried out by or in association with RFID manager 240.

Figure 4:
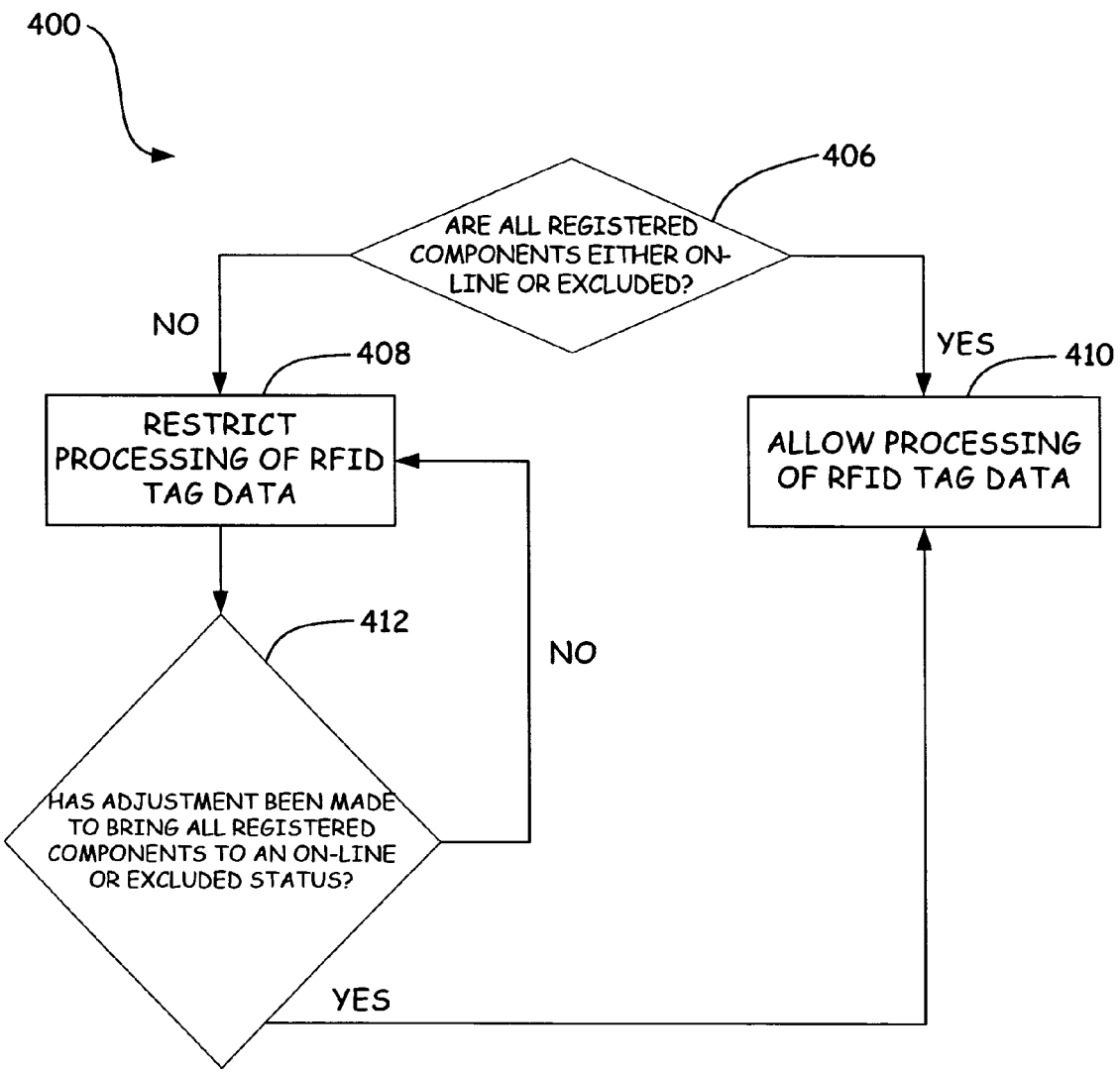
FIG. 4 is a block flow chart illustrating steps associated with one embodiment of a portion of the process illustrated in FIG. 3.

Process 300 is illustratively a three-batch process. FIG. 4 is a block flow chart illustrating steps that, in accordance with one embodiment, are executed as part of the first-batch process. In accordance with block 406, a determination is made as to whether all registered components are either on-line or excluded. If the answer is yes, then the processing of RFID tag data is allowed (i.e., block 410). If the answer is no, then the processing is limited or prohibited (i.e., block 408). In accordance with block 412, an off-line component can be brought on-line or changed to an excluded status. When all registered components are on-line or excluded, then the processing of RFID tag data is allowed (i.e., block 410). In this manner, the chronological integrity of RFID tag data is monitorable based on an expectation of the status of various system components. Thus, the first batch-process, designated by block 302 (FIG. 3), includes facilitating actual communication with a middleware server (e.g., server 206 or 214) and storing received data (e.g., including tag data) in application 202 (e.g., in the Axapta program). In accordance with one embodiment, the recorded transactions are designated in a 'draft mode' state.

The second batch-process, designated by blocks 304 and 306, represents a process in which the data in draft mode is validated and enriched. In one embodiment, included tag data is enriched by being split into separate fields and/or by having additional information added from the program (e.g., from Axapta). The tag data can be evaluated for any attribute including those that are further demonstrative of correct chronological organization. If the validation is successful, then the corresponding transactions are released, and if it fails, the corresponding transactions are set to error.

The third batch-process, as is indicated by blocks 308, 310 and 312, represents a process in which validated records are prepared for and/or subjected to an appropriate business process associated with program 202 (e.g., Axapta). If a transaction is matched to a business process, then it is put into an 'In Progress' state. When the business process ends correctly, the transaction is set to 'Archived'. If the business process fails, the transaction can either remain as 'In Progress' or return to a 'Released' state.

In accordance with one embodiment, RFID manager 240 is configured to only monitor the status of associated servers (i.e., servers 206, 214 and the like) on the network. In another embodiment, however, RFID manager 240 is additionally or alternatively configured to monitor the status of the RFID reader devices affiliated with each server. In accordance with one embodiment, the servers and/or the devices are registered with the RFID manager 240. In one embodiment, it is through a registration process that the RFID manager 240 determines which servers and/or devices to monitor. In one embodiment, to enable processing, each individual device and server that is registered with the RFID manager 240 must either be "online" or it must be designated with an "excluded" status. In one embodiment, "excluded" means that data from the so-designated device will not get into the system. By only allowing these two statuses, some level of guarantee is provided that chronological integrity will be maintained.

One skilled in the art will understand that the accounting of time between RFID middleware servers can become an issue that will have an impact on maintaining the chronological integrity of tag reads from the various distributed sources. In accordance with one embodiment of the present invention, the distributed middleware servers are configured to utilize a common time service and/or the same time server, such as a time service/server associated with an operating system such as Windows® provided by Microsoft of Redmond, Wash.

In accordance with one aspect of the present invention, a general purpose of the RFID manager 240 is to monitor the status of any combination of network components to enable some level of guarantee that the chronological integrity of tag reads will be maintained. In one embodiment, this means monitoring the status of deployed service platforms. In one embodiment, this means monitoring the status of middleware servers on the network. In one embodiment, this means monitoring the status of reader devices. In one embodiment, this means monitoring the status of any combination of network components including any of those referenced herein. The monitoring of all combinations of components, whether included herein or otherwise, are within the scope of the present invention.

Although the present invention has been described with reference to particular embodiments, workers skilled in the art will recognize that changes may be made in form and detail without departing from the spirit and scope of the invention.

What is claimed is:

1. A computer-implemented method for facilitating an accurate chronological organization of a collection of radio frequency identification (RFID) tag data gathered from distributed servers, the method comprising:

utilizing a centralized RFID management component to limit a processing of RFID tag data based at least in part on an operational status of a plurality of remotely distributed sources of RFID tag data, each of the plurality of remotely distributed sources each being specifically identified to the centralized RFID management component as being a registered member of a remotely distributed group of RFID tag data sources from which the collection of tag data is to be organized chronologically, across the sources in the group, based on when the RFID tag data was received;

utilizing the centralized RFID management component to determine that a particular remote RFID server, despite being one of the said plurality of remotely distributed sources of RFID tag data that is a registered member of the remotely distributed group of RFID tag data sources, has its said operational status set to an excluded operational status, the excluded operational status being indicative of a system preference to exclude tag data from the particular remote server regardless of a functional or online/offline status of the particular remote server; and wherein said limiting the processing of RFID tag data comprises responding to the determination that the particular remote RFID server has its said operational status set to the excluded operational status by utilizing a computer processor that is a component of a computer to institute a prohibition of processing RFID tag data from a set of RFID tag readers managed by the particular remote RFID server, and wherein instituting a prohibition of processing RFID tag data from the set of RFID tag readers comprises prohibiting from the collection of tag data all tag data from the set of RFID tag readers managed by the particular remote RFID server.

2. The method of claim 1, wherein said limiting the processing of RFID tag data further comprises:

utilizing the computer processor to make a determination that a particular RFID tag reader, which is one of said plurality of remotely distributed sources of RFID tag data that is a registered member of the remotely distributed group of RFID tag data sources, has its said operational status set to an offline status, the particular RFID tag reader being managed by a second remote RFID server that is different and remotely disposed from said particular remote RFID server; and based on the determination that the operational status of the particular RFID tag reader is set to the offline status, instituting a prohibition of processing said RFID tag data from all of the plurality of remotely distributed sources of RFID tag data that are registered members of the remotely distributed group of RFID tag data sources.

3. The method of claim 2, wherein the particular and second remote RFID servers each include a deployment of an RFID services platform that facilitates, in response to commands received from the centralized RFID management component, said prohibition of processing RFID tag data from the set of RFID tag readers managed by the particular remote RFID server, as well as said prohibition of processing RFID tag data from all of the plurality of remotely distributed sources of RFID tag data that are registered members of the remotely distributed group of RFID tag data sources.

4. The method of claim 2, further comprising:

utilizing the centralized RFID management component to determine that the particular remote RFID server has had its operational status updated such that it is no longer set to the excluded operational status; and utilizing the centralized RFID management component to respond to the determination that the particular remote RFID server has had its operational status updated such that it is no longer set to the excluded operational status by eliminating said prohibition of the processing of RFID tag data from the set of RFID tag readers managed by the particular remote RFID server.

5. The method of claim 4, further comprising:
utilizing the centralized RFID management component to determine that the operational status of said particular RFID tag reader has been updated such that it is no longer set to the offline status; and
utilizing the centralized RFID management component to respond to the determination that the operational status of said particular RFID tag reader has been updated such that it is no longer set to the offline status by eliminating said prohibition of the processing of RFID tag data from all of the plurality of remotely distributed sources of RFID tag data.

6. The method of claim 5, further comprising, upon said elimination of the prohibition of the processing of RFID tag data from the set of RFID tag readers managed by the particular remote RFID server, and upon the elimination of the prohibition of the processing of RFID tag data from all of the plurality of remotely distributed sources of RFID tag data, utilizing the centralized RFID management component to facilitate a resumed processing of RFID tag data from all of the plurality of remotely distributed sources of RFID tag data that are registered members of the remotely distributed group of RFID tag data sources.

7. The method of claim 6, wherein the second RFID server is also one of the plurality of remotely distributed sources of RFID tag data that is a registered member of the remotely distributed group of RFID tag data sources but is determined by the centralized management component not to have said operational status set to the excluded status.

8. The method of claim 7, wherein instituting a prohibition of processing RFID tag data from all of the plurality of remotely distributed sources of RFID data comprises prohibiting from the collection of tag data all tag data from all of the plurality of remotely distributed sources of RFID data that are registered members of the remotely distributed group of RFID tag data sources.

9. A radio frequency identification data management system that facilitates an accurate chronological organization of a collection of radio frequency identification (RFID) tag data gathered from a plurality of remotely distributed sources, the radio frequency identification management system performing a method, the method comprising:
designating as registered the plurality of remotely distributed sources of RFID tag data;
designating an excluded status to a particular one of the plurality of remotely distributed sources of RFID tag data, the particular remotely distributed source of RFID tag data being a functional and available source of RFID tag data;
prohibiting, based on the designated excluded status, inclusion of RFID tag data from said particular source in said collection of RFID tag data;
generating the collection of RFID tag data so as to include RFID tag data from all of the plurality of remotely distributed sources except from said particular source, wherein generating further comprises utilizing a computer processor that is a functional component of a computing device to facilitate the accurate chronological organization of the collection RFID tag data, said accurate chronological organization being such that the collected RFID tag data is organized so as to be accurately indicative of an order in which individual components of the RFID tag data were received by the plurality of sources other than said particular source.

10. The radio frequency identification data management system of claim 9, wherein said particular source is an RFID server that facilitates management of a set of RFID readers, and wherein said prohibiting inclusion of RFID tag data from said particular source further comprises prohibiting inclusion of RFID tag data from the set of RFID readers.

11. A system for encouraging an accurate chronological organization of radio frequency identification (RFID) tag data gathered from distributed sources, the system comprising:
a first source of RFID tag data;
a second source of RFID tag data;
a third source of RFID tag data;
an RFID manager that utilizes a computer processor that is a functional component of a computing device to monitor an operational status of the first, second and third sources of RFID tag data, wherein the RFID manager also utilizes the computer processor to adjust, based on the operational status of the first, second and third sources, a processing of RFID tag data so as to promote the accurate chronological organization of a collection of RFID tag data that includes the RFID tag data from at least the first and second sources; and
wherein the RFID manager determines that the operational status of the third source indicates that the third source has been designated an excluded status despite being a functional and available source of RFID tag data, and wherein the RFID manager, in response to the determination, excludes RFID tag data from the third source from the collection of RFID tag data.

12. The system of claim 11, wherein the RFID manager monitors the operational status of the first source and determines that it is neither on-line or inactive and, in response to this determination, terminates processing of RFID tag data from either of the first and second sources until the operational status of the first source is updated to an on-line or inactive state.

13. The system of claim 11, wherein the RFID manager monitors the operational status of at least one reader device associated with each of the first and second sources of RFID tag data.

14. The system of claim 11, wherein both the first and second sources are registered sources.

15. The system of claim 11, wherein each of the first and second sources is associated with a separate deployment of an RFID services platform.

16. The system of claim 11, wherein the RFID manager adjusts said processing by preventing a transfer of RFID tag data from one or both of the first and second sources.

17. The system of claim 11, wherein the third source is an RFID server that facilitates management of a set of RFID readers, and wherein when the RFID manager performs said step of excluding RFID tag data from the third source from the collection of RFID tag data the RFID manager excludes RFID tag data from any of said set of RFID readers.

18. The system of claim 11, wherein the RFID manager supports monitoring by obtaining information pertaining to device installation characteristics.

19. The system of claim 11, wherein the RFID manager supports monitoring by obtaining information pertaining to a starting or stopping of processes.

20. The system of claim 11, wherein the RFID manager supports monitoring by obtaining information pertaining to an exclusion or inclusion of servers, devices or processes.

* * * * *